(12) United States Patent
Lee et al.

(10) Patent No.: US 7,175,242 B2
(45) Date of Patent: Feb. 13, 2007

(54) DISPLAY APPARATUS

(75) Inventors: Kyung-kyun Lee, Seoul (KR); Kwang-sung Hwang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 179 days.

(21) Appl. No.: 10/923,092

(22) Filed: Aug. 23, 2004

(65) Prior Publication Data

US 2005/0040738 A1 Feb. 24, 2005

(30) Foreign Application Priority Data

Aug. 22, 2003 (KR) ...................... 10-2003-0058373

(51) Int. Cl.
*A47B 81/06* (2006.01)
(52) U.S. Cl. ..................... 312/7.2; 312/265.5; 345/905
(58) Field of Classification Search .................. 40/781; 345/905; 312/7.2, 265.5, 265.6, 257.1, 263
See application file for complete search history.

(56) References Cited

U.S. PATENT DOCUMENTS

| 2,850,343 | A | * | 9/1958 | Hubbard et al. | ............. 312/7.2 |
|---|---|---|---|---|---|
| 3,352,083 | A | * | 11/1967 | Stute | ......................... 52/716.1 |
| 3,918,187 | A | * | 11/1975 | Vogele | ......................... 40/781 |
| 4,411,480 | A | * | 10/1983 | Gibson | ........................ 312/7.2 |
| 5,012,601 | A | * | 5/1991 | Garland et al. | ............... 40/781 |
| 6,826,863 | B1 | * | 12/2004 | Goodfellow | ................. 40/725 |
| 7,002,792 | B2 | * | 2/2006 | Han et al. | .................... 361/681 |
| 7,028,425 | B2 | * | 4/2006 | Lasher | ........................ 40/781 |
| 2005/0105259 | A1 | * | 5/2005 | Lee et al. | .................... 361/681 |
| 2005/0231658 | A1 | * | 10/2005 | Chieh | .......................... 349/56 |

FOREIGN PATENT DOCUMENTS

| JP | 2000-36490 | | 2/2000 |
|---|---|---|---|
| JP | 2001013889 | * | 1/2001 |
| KR | 2001-46528 | | 6/2001 |
| KR | 10-303076 | | 7/2001 |
| KR | 10-313028 | | 10/2001 |

\* cited by examiner

*Primary Examiner*—Janet M. Wilkens
(74) *Attorney, Agent, or Firm*—Staas & Halsey LLP

(57) ABSTRACT

A display apparatus including: a bezel formed with a bending part on an edge thereof; an inner casing which is contact-accomodatable inside the bezel and having a combining hole having an inside wall to contact the bending part when the bezel and the inner casing are combined; and a locking member which cooperates with the combining hole and to be contact-supported by the bending part so as to combine the bezel with the inner casing.

12 Claims, 5 Drawing Sheets

DISPLAY APPARATUS

CROSS-REFERENCE TO RELATED APPLICATION

This application claims the benefit of Korean Patent Application No. 2003-58373, filed Aug. 22, 2003, in the Korean Intellectual Property Office, the disclosure of which is incorporated herein by reference.

BACKGROUND OF THE INVENTION

1. Field of the Invention

The present invention relates to a display apparatus, and more particularly, to a display apparatus in which a front bezel and an inner casing are easily and stably combined.

2. Description of the Related Art

Generally, a display apparatus is a device to visually provide information or graphics on a screen.

As a kind of a flat-panel display apparatus, particularly, an LCD (Liquid Crystal Display) apparatus is widely and increasingly used in a monitor for a computer, a television, etc., and this trend has caused demand therefor to increase.

A conventional display apparatus comprises a display part to display a picture (i.e., an image) thereon, and a stand to support the display part. As shown in FIG. 1, the display part of the display apparatus employs an adhesive member 2 such as double-sided adhesive tape for combining a front bezel 4 with an inner casing 6. However, the adhesive force of the adhesive member 2 weakens over time, so that not only is combining the structure difficult, but it is also difficult to reassemble the display part after disassembly.

Recently, there have been disclosed various display apparatus (for example, Japanese Patent First Publication No. 2001-013889), in which the front bezel and the inner casing are combined without a separate adhesive member, but they are relatively complicated, thus making assembly and operation less efficient.

SUMMARY OF THE INVENTION

Accordingly, it is an aspect of the present invention to provide a display apparatus in which a front bezel and an inner casing are easily combined and its combination is securely kept.

Additional and/or other aspects and advantages of the invention will be set forth in part in the description which follows and, in part, will be obvious from the description, or may be learned by practice of the invention.

According to an aspect of the present invention, there is provided a display apparatus comprising a front bezel formed with a bending part on an edge thereof; an inner casing contact-accommodated inside the front bezel and formed with a combining hole having an inside wall to be in contact with the bending part; and a locking member combined to the combining hole to be contact-supported by the bending part and combining the front bezel with the inner casing.

The locking member may include a contact-supporting part contact-inserted between the bending part of the front bezel and the inner casing being in contact with an inside wall of the front bezel, and a fastening part extended from the contact-supporting part and fastened to a wall of the inner casing.

The fastening part may be formed with a through hole, and the inner casing may be formed with a screw combining part on a wall thereof corresponding to the through hole, so that the locking member is fastened to the inner casing with a screw.

According to another aspect of the invention, there is provided a display apparatus including: a casing having a combining hole having an inside wall; a bezel configured to accommodate the casing and having a bending part on an edge thereof which contacts the inside wall when the casing and the bezel are combined; and a locking member which cooperates with the combining hole and to be contact-supportable by the bending part so as to combine the bezel with the inner casing.

According to yet another aspect of the present invention, there is provided a display apparatus including: an inner casing having a combining hole with an inside wall; a bezel having a circumferential lip defining an accommodating space dimensioned to accommodate the inner casing and having a bending part at an edge thereof which contacts the inside wall when the inner casing is accommodated in the bezel; and means for combining the bezel with the inner casing via the combining hole, the combining means being contact-supported by the bending part when the bezel is combined with the inner casing.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENT

Figure 1:
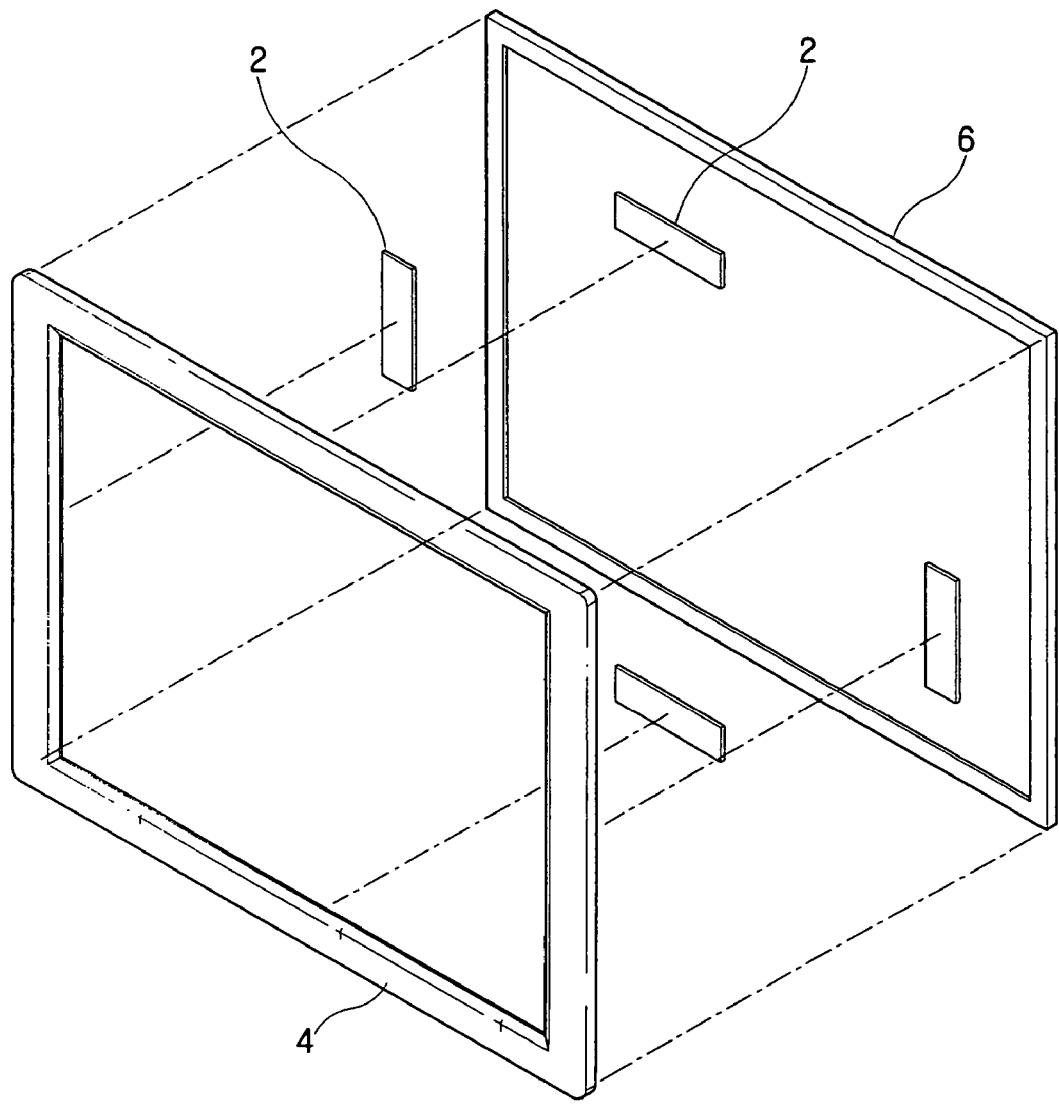
FIG. 1 is an exploded perspective view illustrating combining structure of a front bezel and an inner casing in a conventional display apparatus.

Reference will now be made in detail to an embodiment of the present invention, an example of which is illustrated in the accompanying drawings, wherein like reference numerals refer to like elements throughout. The embodiment is described below in order to explain the present invention by referring to the figures.

Figure 2:
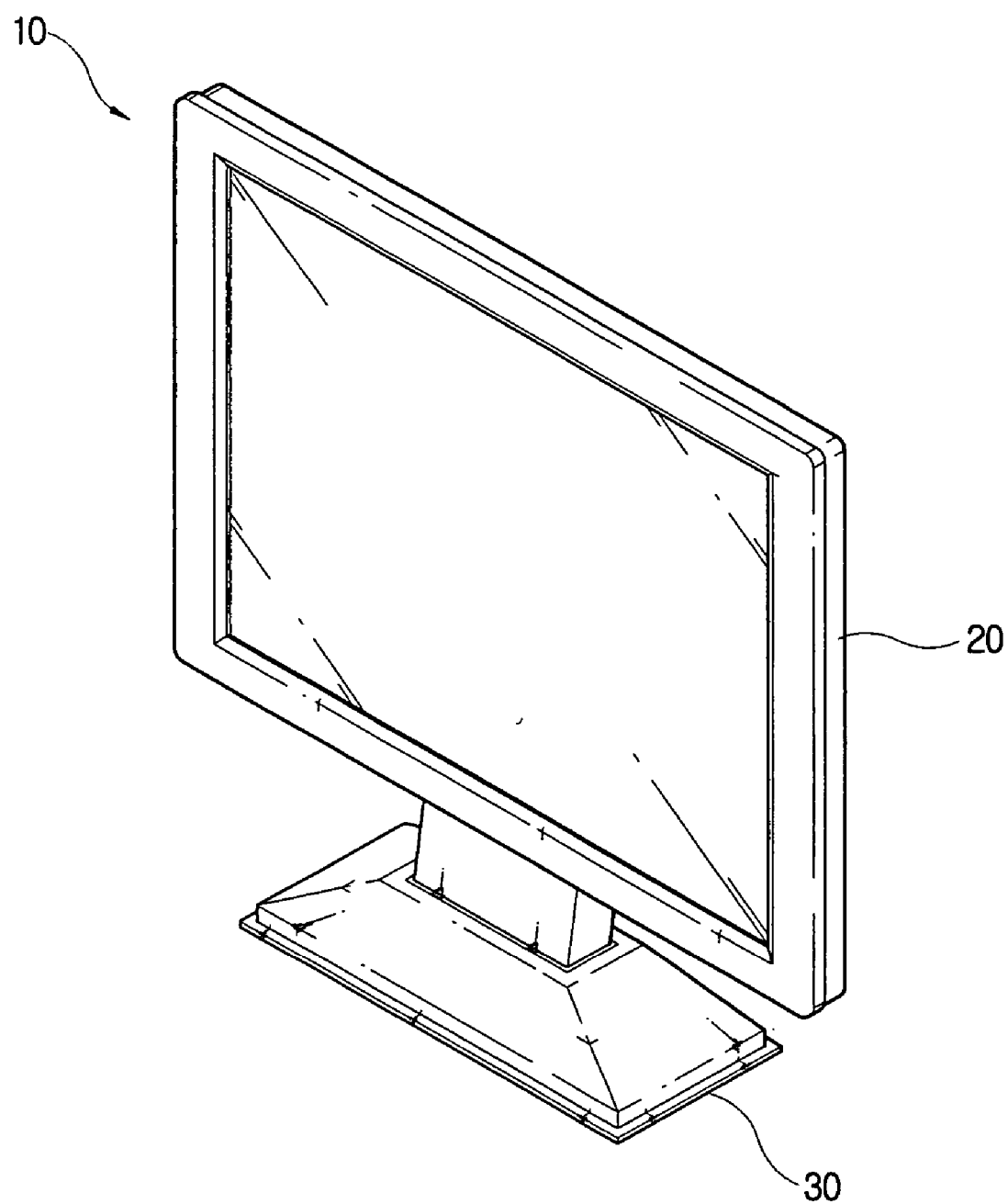
FIG. 2 is a perspective view of a display apparatus according to the present invention.

As shown in FIG. 2, a display apparatus 10 according to the embodiment of the present invention comprises a display part 20 to display a picture thereon, and a stand 30 to support the display part 20.

Figure 3:
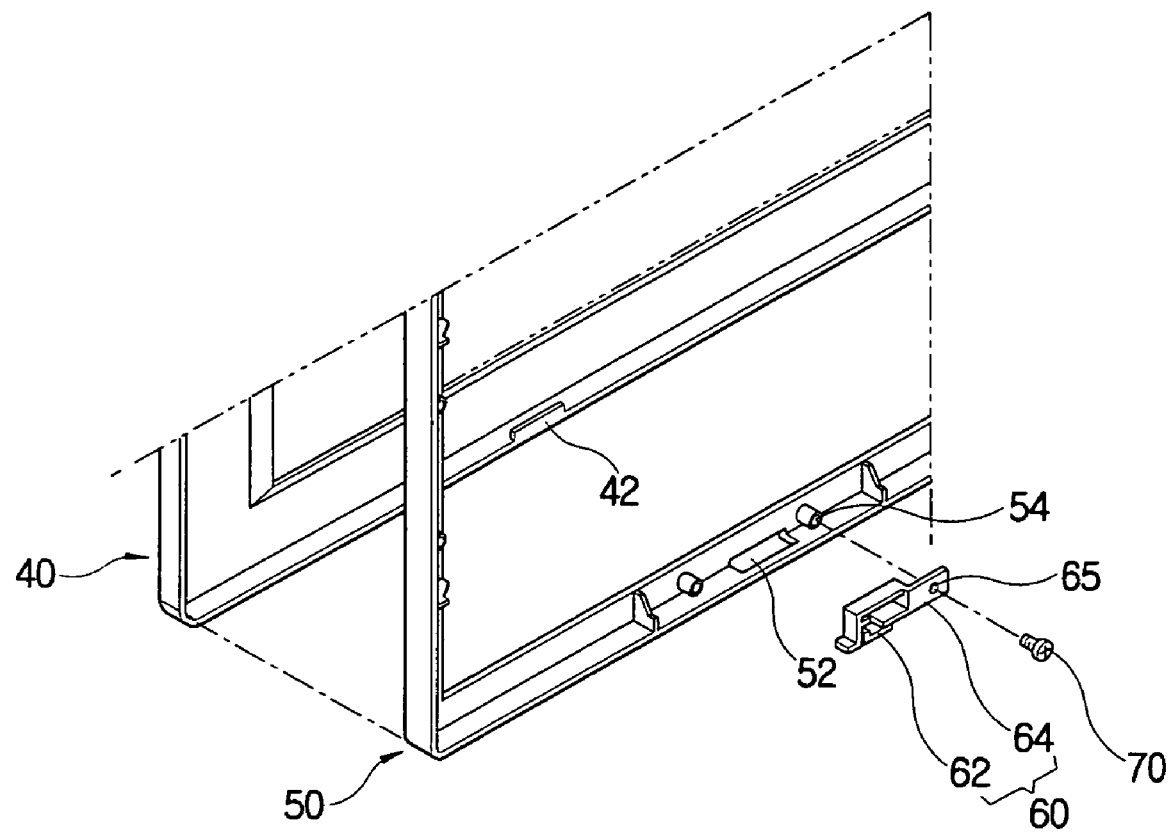
FIG. 3 is an exploded perspective view illustrating combining structure of a front bezel and an inner casing in the display apparatus according to the present invention.

As shown in FIG. 3, display part 20 includes a front bezel 40 formed with a bending part 42 on an edge thereof; an inner casing 50 which is contact-accommodatable inside the front bezel 40 and formed with a combining hole 52 having an inside wall to be in contact with the bending part 42 when the front bezel 40 and the inner casing 50 are combined; and a locking member 60 insertable in the combining hole 52 to be contact-supported by the bending part 42 and combining the front bezel 40 with the inner casing 50.

The front bezel 40 is made of an aluminum material to enhance its outer appearance, and with an accommodating space being formed inside the back of the front bezel 40 and accommodating the inner casing 50 therein.

The bending part 42 is incorporated with the front bezel 40 on the edge of the accommodating space, and contact-supports the locking member 60 when the front bezel 40 and the inner casing 50 are combined, thereby maintaining the combination of the front bezel 40 and the inner casing 50.

The inner casing 50 has a similar shape to the front bezel 40, with the combining hole 52 that is approximately equal to the locking member 60 in size.

The locking member 60 includes a contact-supporting part 62 contact-insertable between the bending part 42 of the front bezel 40 and the inner casing 50 being in contact with an inside wall of the front bezel 40, and a fastening part 64 extended from the contact-supporting part 62 and fastened to a wall of the inner casing 50.

Figure 4:
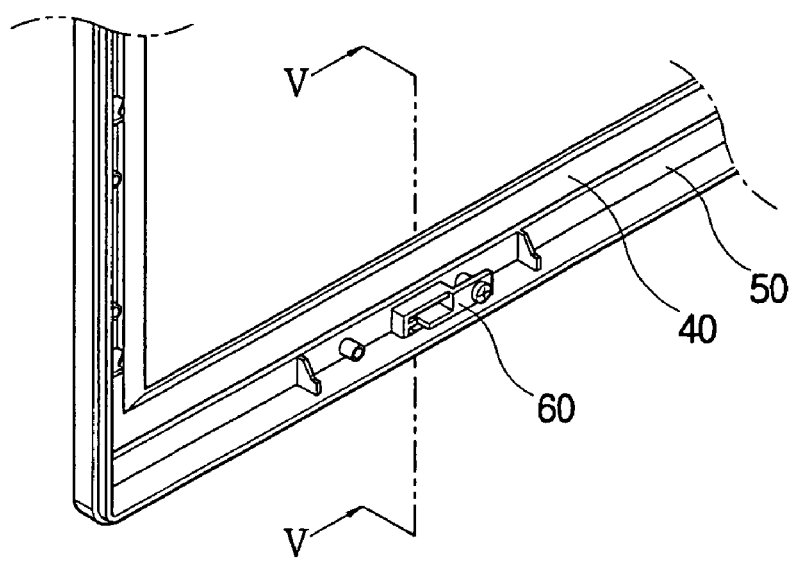
FIG. 4 is a combined perspective view of FIG. 3.

The locking member 60 is made of a synthetic resin excellent in durability and assembling efficiency, but may be made of various other materials. Further, a structure of the locking member 60 may vary as long as the front bezel 40 and the inner casing 50 are securely combinable, as shown in FIG. 4. As necessary, multiple locking members 60 may be provided in all directions (i.e., on plural sides of the front bezel) so as to more securely combine the front bezel 40 with the inner casing 50.

Figure 5:
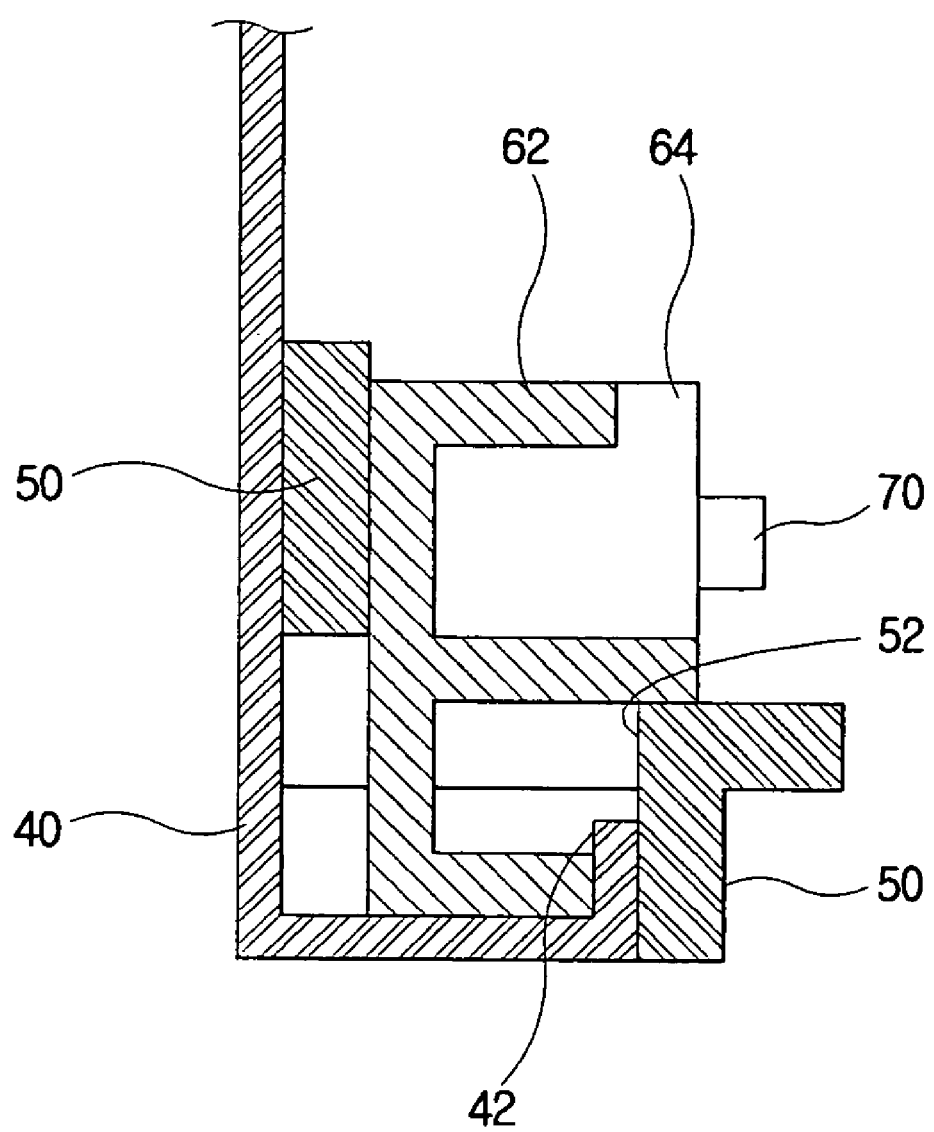
FIG. 5 is a sectional view of FIG. 4, taken along line V—V.

Turning now to FIG. 5, the front bezel 40 and the inner casing 50 are described in a combined condition. The contact-supporting part 62 is inserted in the combining hole 52 of the inner casing 50, with a first part supporting the bending part 42 of the front bezel 40 and a second part supporting the inside wall of the inner casing 50, thereby securely combining the front bezel 40 with the inner casing 50 by a compressive force.

The fastening part 64 is formed with a through hole 65, and the wall of the inner casing 50 is formed with a screw combining part 54 corresponding to the throughhole 65, so that the locking member 60 is fastened to the inner casing 50 with a screw 70. Although a screw is described and illustrated, it is to be understood that other modes of connecting the locking member 60 to the inner casing 50 are possible.

In this embodiment, other components of the display apparatus except the front bezel 40, the inner casing 50 and the locking member 60 employ conventional structures, so that further descriptions thereof are omitted.

With this configuration, the front bezel 40 and the inner casing 50 are combined as follows.

First, the inner casing 50 is contact-accommodated inside the front bezel 40, with the bending part 42 formed on the edge of the front bezel 40 being in contact with the inside wall of the combining hole 52 formed in the inner casing 50.

Then, the locking member 60 is inserted in the combining hole 52 of the inner casing 50, so that the locking member 60 is seated on the front bezel 40 and contact-supported by the bending part 42. Therefore, the front bezel 40 and the inner casing 50 are securely combined. At this time, the locking member 60 is fastened to the inner casing 50 with the screw 70 so as to maintain the combination of the front bezel 40 and the inner casing 50.

Oppositely, to separate the front bezel 40 from the inner casing 50, the locking member 60 can be removed by releasing the screw 70 fastening the locking member 60.

As described above, the embodiment of the present invention provides a display apparatus in which a front bezel and an inner casing are easily and stably combined by a locking member.

Further, the embodiment of the present invention provides a display apparatus in which combining structure of a front bezel and an inner casing is simple, thereby increasing assembling efficiency.

Although an embodiment of the present invention has been shown and described, the present invention is not limited to this embodiment. Rather, it will be appreciated by those skilled in the art that changes may be made in this embodiment without departing from the principles and spirit of the invention, the scope of which is defined by the appended claims and their equivalents.

What is claimed is:

1. A display apparatus comprising:
    a bezel formed with a bending part on an edge thereof;
    an inner casing which is contact-accommodatable inside the bezel and having a combining hole having an inside wall to contact the bending part when the bezel and the inner casing are combined; and
    a locking member which cooperates with the combining hole and to be contact-supported by the bending part so as to combine the bezel with the inner casing,
    wherein the locking member includes a contact-supporting part which is contact-insertable between the bending part of the bezel and the inner casing and dimensioned to contact an inside wall of the bezel, and a fastening part extended from the contact-supporting part and fastened to a wall of the inner casing.

2. The display apparatus of claim 1, wherein the fastening part is formed with a throughhole, and
    wherein the inner casing has a screw combining part on a wall thereof corresponding to the throughhole, so that the locking member is fastenable to the inner casing with a screw.

3. The display apparatus of claim 1, wherein the bezel is made of aluminum.

4. The display apparatus of claim 1, wherein the bezel has an accommodating space formed inside a back of the bezel and which accommodates the inner casing.

5. The display apparatus of claim 4, wherein the bending part is on an edge of the accommodating space, and contact-supports the locking member.

6. The display apparatus of claim 1, wherein the inner casing has a shape about identical to a shape of the bezel.

7. The display apparatus of claim 1, wherein the combining hole has a size about identical to a size of the locking member.

8. The display apparatus of claim 1, wherein the locking member is made of a synthetic resin.

9. The display apparatus of claim 1, further comprising plural locking members.

10. A display apparatus comprising:
    a casing having a combining hole having an inside wall;
    a bezel configured to accommodate the casing and having a bending part on an edge thereof which contacts the inside wall when the casing and the bezel are combined; and
    a locking member which cooperates with the combining hole and to be contact-supportable by the bending part so as to combine the bezel with the inner casing
    wherein the locking member includes a contact-supporting part which is contact-insertable between the bending part of the bezel and the casing and dimensioned to contact an inside wall of the bezel, and a fastening part extended from the contact-supporting part and fastened to a wall of the casing.

11. A display apparatus comprising:
    an inner casing having a combining hole with an inside wall;
    a bezel having a circumferential lip defining an accommodating space dimensioned to accommodate the inner casing and having a bending part at an edge thereof which contacts the inside wall when the inner casing is accommodated in the bezel; and means for combining the bezel with the inner casing via the combining hole, the combining means being contact-supported by the bending part when the bezel is combined with the inner casing, wherein the means includes a contact-supporting part which is contact-insertable between the bending part of the bezel and the casing and dimensioned to contact an inside wall of the bezel, and a fastening part extended from the contact-supporting part and fastened to a wall of the casing.

12. A lock which cooperates with a combining hole of a casing having an inside wall to contact a bending part at an edge of a bezel when the bezel and the casing are combined and to be contact-supported by the bending part so as to combine the bezel with the casing, comprising a fastening part, a contact supporting part which is contact-insertable between the bending part and the casing and which is dimensioned to contact an inside wall of the bezel, and wherein the fastening part extends from the contact-supporting part and is fastened to a wall of the casing.

* * * * *

UNITED STATES PATENT AND TRADEMARK OFFICE
CERTIFICATE OF CORRECTION

PATENT NO. : 7,175,242 B2 Page 1 of 1
APPLICATION NO. : 10/923092
DATED : February 13, 2007
INVENTOR(S) : Kyung-kyun Lee et al.

It is certified that error appears in the above-identified patent and that said Letters Patent is hereby corrected as shown below:

Column 4, Line 29, change "bezel" to --front bezel--.

Column 6, Line 1, after "of a bezel" insert --formed with a bending part at an edge thereof--.

Signed and Sealed this

Fourth Day of March, 2008

JON W. DUDAS
*Director of the United States Patent and Trademark Office*